(12) United States Patent
Reznik et al.

(10) Patent No.: US 7,688,979 B2
(45) Date of Patent: Mar. 30, 2010

(54) MIMO AIR INTERFACE UTILIZING DIRTY PAPER CODING

(75) Inventors: Alexander Reznik, Titusville, NJ (US); Guodong Zhang, Farmingdale, NY (US); Sung-Hyuk Shin, Northvale, NJ (US); Zhenyu Tu, Bethlehem, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 989 days.

(21) Appl. No.: 11/238,342

(22) Filed: Sep. 29, 2005

(65) Prior Publication Data

US 2006/0210070 A1    Sep. 21, 2006

Related U.S. Application Data

(60) Provisional application No. 60/663,920, filed on Mar. 21, 2005.

(51) Int. Cl.
*H04W 40/12* (2009.01)
*H04W 12/08* (2009.01)

(52) U.S. Cl. .............. 380/270; 455/410; 455/450; 455/413; 455/121; 360/270; 360/42; 360/253; 360/254; 713/153; 726/12

(58) Field of Classification Search .......... 380/238, 380/253, 254, 38, 247, 100, 270; 713/501, 713/166, 172, 185; 455/426.1, 410, 450; 726/14, 17, 22; 379/230; 385/24; 370/426; 712/237, 204
See application file for complete search history.

(56) References Cited

U.S. PATENT DOCUMENTS

| 6,785,341 | B2 * | 8/2004 | Walton et al. ............... 375/267 |
| 2003/0014641 | A1 | 1/2003 | Delanghe et al. |
| 2003/0103584 | A1 | 6/2003 | Bjerke et al. |
| 2003/0104808 | A1 | 6/2003 | Foschini et al. |
| 2003/0108117 | A1 | 6/2003 | Ketchum et al. |
| 2004/0033782 | A1 | 2/2004 | Horng et al. |
| 2004/0095907 | A1 | 5/2004 | Agee et al. |
| 2005/0021329 | A1 | 1/2005 | Lin et al. |

(Continued)

FOREIGN PATENT DOCUMENTS

EP    1 207 645    5/2002

(Continued)

OTHER PUBLICATIONS

"Dirty Paper Coding vs. TDMA for MIMO Broadcast Channels" Nihar Jindal & Andrea Goldsmith, Jun. 10, 2004.*

(Continued)

*Primary Examiner*—Taghi T. Arani
*Assistant Examiner*—Mohammad L Rahman
(74) *Attorney, Agent, or Firm*—Volpe and Koenig, P.C.

(57) ABSTRACT

A transceiver comprising a data processing module, a security processing module, a medium access control (MAC) module, a dirty-paper-coding (DPC) module, and a smart antenna processor. The data processing module provides user data streams to the MAC module and channel state information to the smart antenna processor. The security processing module generates security data and provides the security data to the MAC module. The security module also provides security policy data to the smart antenna processor. The MAC module determines data transmission rates for the user data streams and the security data. In addition, the MAC module allocates the data streams and security data to transmission channels for transmission. The DPC module encodes the security data onto the user data streams. The smart antenna processor generates pre-coding coefficients used by the DPC module and transmits the security encoded data streams.

20 Claims, 3 Drawing Sheets

U.S. PATENT DOCUMENTS

| | | | |
|---|---|---|---|
| 2005/0043031 | A1 | 2/2005 | Cho et al. |
| 2005/0138421 | A1* | 6/2005 | Fedronic et al. ............. 713/201 |
| 2005/0232370 | A1* | 10/2005 | Trachewsky et al. ........ 375/267 |

FOREIGN PATENT DOCUMENTS

| | | |
|---|---|---|
| WO | 03/047032 | 6/2003 |
| WO | 2005/020466 | 3/2005 |

OTHER PUBLICATIONS

"An Improved Detection Technique for Receiver Oriented MIMO-OFDM Systems" Hrishikesh Venkataraman, 2004, Dresden.*

"Smart Antennas", Michael Chryssomallis.*

"On the optimality and performance of transmit and receive space diversity in MIMO channels", M Wennstorm.*

Marton, "A Coding Theorem for the Discrete Memoryless Broadcast Channel", IEEE Trans. Inf. Theory, vol. IT-25, 1979, pp. 306-311.

Costa, "Writing on Dirty Paper", IEEE Trans. Inf. Theory, vol. IT-29, 1983, pp. 439-441.

El Gamal et al., "A Proof of Marton's Coding Theorem for the Discrete Memoryless Broadcast Channel", IEEE Trans. Inf. Theory, vol. IT-27, 1981, pp. 120-122.

Caire et al., "On the Achievable Throughput of the Multiantenna Gaussian Broadcast Channel", IEEE Trans. Inf. Theory, vol. IT-49, 2003, pp. 1691-1706.

Caire et al., "On Achievable Rates in a Multi-antenna Broadcast Downlink", Proc. 38$^{th}$ Annual Allerton Conf. on Comm. Control and Computing, Monticello, IL, 2000.

Caire et al., "On Achievable Rates in Multi-antenna Gaussian Broadcast Channel", Proc. 2001 Int. Symp. Inf. Theory.

Caire et al., "On the Multiple-antenna Broadcast Channel", Proc. 36$^{th}$ Asilomar Conf. on Signals, Systems and Computers, 2001.

Yu, "Competition and Cooperation in Multi-User Communication Environments", Ph.D. Thesis, Stanford University, Stanford, California, 2002.

Weingarten et al., "The Capacity Region of the Gaussian MIMO Broadcast Channel", Proceedings of CISS '04, Mar. 2004.

Yu et al., "Iterative Water-filling of Gaussian Vector Multiple Access Channel", submitted to IEEE Transactions on Information Theory, 2004.

Yu et al., "Trellis Precoding for the Broadcast Channel", IEEE Globecom, Nov. 2001.

Chryssomallis, "Smart Antennas," IEEE Antennas and Propagation Magazine, vol. 42, No. 3 (Jun. 2000).

Wennstrom et al., "On the Optimality and Performance of Transmit and Receive Space Diversity in MIMO Channels," IEE Seminar on MIMO: Communications Systems from Concept to Implementations (Dec. 2001).

Jindal et al., "*Dirty Paper Coding* vs. *TDMA for MIMO Broadcast Channels*," Submitted to IEEE Trans. on Information Theory (Jun. 10, 2004).

Venkataraman et al., "An Improved Detection Technique for Receiver Oriented MIMO-OFDM Systems," 9$^{th}$ International OFDM-Workshop, Dresden, (2004).

* cited by examiner

MIMO AIR INTERFACE UTILIZING DIRTY PAPER CODING

CROSS REFERENCE TO RELATED APPLICATION

This application claims the benefit of U.S. Provisional Application No. 60/663,920 filed Mar. 21, 2005, which is incorporated by reference as if fully set forth.

FIELD OF INVENTION

The present invention relates to wireless communication systems. More particularly, the present invention relates to utilizing dirty paper coding (DPC) to increase data throughput in wireless communications.

BACKGROUND

Modern communication systems support deployments wherein single-source terminals are configured to communicate various types of information to multiple terminals. One example of such a deployment includes a cellular communication system, such as a universal mobile telecommunication system (UMTS), wherein a base station communicates with a plurality of user terminals. Another example deployment includes an access point transmitting to multiple terminals in a wireless local area network (WLAN) system. These single-source-to-multiple-terminal types of deployments are commonly referred to as "broadcasting", "multicasting", or more generally as "point-to-multipoint" (PtM) communications.

Traditional PtM communication systems may be classified into one of two categories. The first category includes deployments in which transmissions to various receivers are permitted to interfere with each other. An example of this first type of PtM deployment includes a traditional code division multiple-access (CDMA) system, wherein pseudo-random codes are used to code various communications prior to their transmission. Upon receiving the coded transmissions, the user terminals synchronize the codes of the various transmissions to recover the communicated data. Although pseudo-random coding in the transmission source is useful in mitigating cross-interference, the true burden of mitigating this interference lies in the receiving terminals.

In the second, more frequently utilized category of PtM deployments, interference is altogether avoided via the use of orthogonal transmissions. Examples of such deployments include those specified by the Global System for Mobile Communications (GSM) standards, such as frequency division multiple access (FDMA) systems and time division multiple access (TDMA) systems. In these types of PtM communication systems, a transmitting terminal transmits various communication signals using mathematically orthogonal or non-interfering "spaces". These spaces may be defined as a frequency range (as in a FDMA system), a time-slot (as in a TDMA system), or a Walsh code (as in an orthogonal code CDMA system). Unlike the first category of PtM communication systems, the transmitting terminal in this second category is solely responsible for preventing signal interference. As a result, receiving terminals in such systems are typically no more complex than those used in basic point-to-point communication systems. Although this category of PtM systems is superior, it should be understood that the performance of such systems is limited by the number of available orthogonal spaces and/or dimensions.

Figure 1:
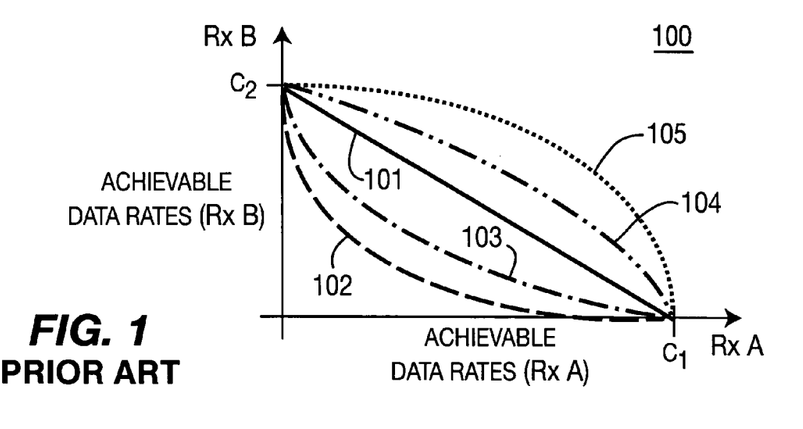
FIG. 1 is a graph illustratively depicting achievable data rate regions to the two receivers under different precoding schemes.

Referring now to FIG. 1, a graph 100 illustrating achievable data transmission rates 101-105 to the two receivers, Rx A and Rx B, in a PtM system is shown. It should be understood that FIG. 1 is for illustrative purposes only and that is does not represent actual test results.

If all the available transmission bandwidth in a FIG. 1 system were allocated to say, receiver Rx A, Rx A would receive service at a highest achievable data rate $C_1$ and Rx B would receive no data. Similarly, if all the available transmission bandwidth were allocated to receiver Rx B, Rx B would receive service at a highest achievable data rate $C_2$ and Rx A would receive no data.

If receivers Rx A and Rx B were operating in, for example, a TDMA system (which is equivalent to time-sharing), they would be capable of achieving data transmission rates at and to the left of the solid line 101 on the graph 100. As time sharing represents a special case of orthogonal multiplexing, similar rates are achievable by any system which maintains orthogonality between transmission signals.

In a PtM system, where orthogonality between transmission signals is not maintained, the transmission performance to any number of receivers can suffer as compared to that of an orthogonal system, such as TDMA. To illustrate, reference is again made to FIG. 1. Line 102, for example, may be representative of achievable data rates in a typical random code CDMA system utilizing a standard RAKE receiver. Line 103 may be representative of achievable data rates in a typical random code CDMA system utilizing a more advanced MMSE multi-user detector. As indicated by the graph 100, the achievable data rates represented by line 103 are superior to those represented by line 102. Neither provides, however, the performance of line 101, which as described above, represents an achievable performance rate of transmission signals that are maintained orthogonal to each other.

It is well known from information theory that data rates superior to that of orthogonal coding (e.g., TDMA) are achievable in PtM systems. These superior data rates may be represented, for example, by lines 104 and 105 of the graph 100 shown in FIG. 1. To achieve these superior data rates 104, 105, however, requires the use of receivers having receiver structures that are far more advanced then those used in typical receivers. To illustrate, information-theoretic successive interference cancellation (IT-SIC) can improve the performance of a CDMA system to where it actually performs better than TDMA systems. While such a result is counterintuitive at first, it is noted that the performance of a TDMA system is limited by the availability of orthogonal or non-interfering spaces or time-slots. IT-SIC structures allow interference, but in a controlled manner, and shifts interference cancellation to the receivers. Utilizing such structures enables a CDMA system to achieve data rates beyond those achievable with TDMA systems, such as those represented by the line 104 on the graph in FIG. 1.

There are several problems with this IT-SIC approach. First, it requires highly complex receivers. Providing such complex receivers is problematic particularly in modern cellular systems, wherein the receivers must be able to be embedded in relatively small, inexpensive terminal units with limited battery life. In addition, these complex receivers must possess information regarding both their own communication channel and the communication channels of all other users in the system. Dissemination of such channel information in practical communication systems is highly challenging.

The problems cited above may be addressed using a technique called dirty paper coding (DPC). It is known theoretically that DPC performs at least as well as IT-SIC and in many cases, optimizes data throughput as illustrated by dashed line 105 on the graph 100 in FIG. 1. In addition to providing for superior system performance, DPC has the added benefit of being a transmit-side ("pre-coding") technique. In other words, as in traditional TDMA and FDMA systems, the burden and complexity of interference cancellation is dealt with in the transmitting terminal, but without the limitations of orthogonal spaces. As a result, receivers are only required to possess detailed information pertaining to their particular communications. Furthermore, because each receiver operates optimally without possessing details of transmissions intended for other receivers, DPC provides a methodology for hiding transmissions from unintended receivers, thus making it suitable to support data hiding, watermarking, and other security applications.

The term "precoding", as used herein, refers to the mutual coding of multiple data streams while in the transmitter in order to pre-cancel any interference the data streams may cause each other; as opposed to attempting to cancel interference at individual receiving terminals post-transmission. It should be understood that pre-coding does not specifically imply that further coding steps will be performed, although further coding functions are possible.

While recent analysis of DPC has yielded significant progress in the theoretical understanding of this technique, little is understood about how to build practical communication systems with DPC.

Accordingly, it is desirable to have a method and apparatus that utilizes DPC to optimize system performance and improve the signal quality of transmission signals. It is further desirable to have a method and apparatus that utilizes DPC to support security-oriented applications such as data-hiding and watermarking.

It is well known that the use of multiple antennas provides for increased data throughput (via multiplexing) and improved signal quality of transmission signals (via diversity and/or beamforming). In addition, multiple antenna implementations, such as those found in MIMO (Multiple-Input Multiple-Output) and/or Smart antenna systems, enable transmission signals to be separated in a spatial domain (e.g., Spatial Division Multiple Access). To exploit these multiple antenna advantages, a MIMO technique, for example, may be combined with a signal processing technique such as FEC (forward error correction) coding and/or a radio air interface such as CDMA. There does not exist, however, a means for further improving multiple antenna systems utilizing DPC.

Accordingly, it is further desirable to have a method and apparatus that combines DPC with multiple antenna implementation(s) to improve both system performance and security enhancements.

SUMMARY

The present invention relates to a method and apparatus for optimizing system performance utilizing dirty-paper-coding (DPC) and/or multiple antennas to support security-oriented applications such as data-hiding and watermarking. A transceiver comprises a data processing module, a security processing module, a medium access control (MAC) module, a DPC module, and a smart antenna processor. The data processing module provides user data streams to the MAC module and channel state information to the smart antenna processor. The security processing module generates security data in the form of tokens and keys and provides the security data to the MAC module. In addition, the security module provides security policy data to the smart antenna processor. The MAC module determines data transmission rates for the user data streams and the security data. In addition, the MAC module allocates the data streams and security data to transmission channels for transmission. The DPC module encodes the security data onto the user data streams and provides the encoded data streams to the smart antenna processor. The smart antenna processor generates pre-coding coefficients for use by the DPC module and transmits the security encoded data streams.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

Hereafter, the terminology "wireless transmit/receive unit" (WTRU) includes but is not limited to a user equipment, a mobile station, a fixed or mobile subscriber unit, a pager, or any other type of device capable of operating in a wireless environment. When referred to hereafter, the terminology "base station" includes but is not limited to a Node-B, a site controller, an access point or any other type of interfacing device in a wireless environment.

Figure 2:
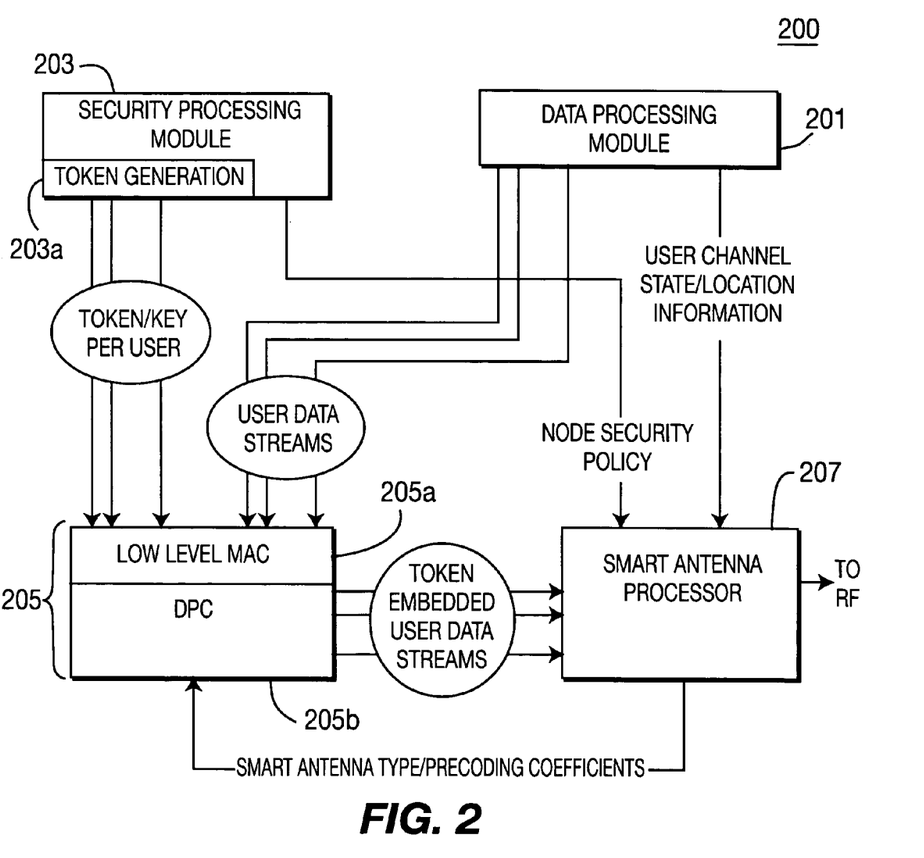
FIG. 2 is a block diagram presenting the four major components of a dirty-paper coding (DPC) enabled transceiver.

Referring now to FIG. 2, a block diagram 200 presenting four major components of a DPC-enabled transceiver is shown. These four (4) components include: 1) a DPC module 205; 2) a data processing module 201; 3) a security processing module 203; and 4) a smart antenna processor 207. Included in the DPC module 205 is a low level medium access control (MAC) sub module 205a and a DPC component 205b. The security processing module 203 includes a token generation sub-module 203a. In addition to the four main components 201, 203, 205, 207 depicted in FIG. 2, a DPC-enabled transceiver may further comprise a plurality of other components and sub-modules (not shown), depending on the particular requirements of such a device.

The Data processing module 201 provides user data streams to the MAC sub-module 205a. Also received at the MAC sub-module 205a are security tokens and keys (for each user in the PtM system) generated by the token generation sub-module 203a. Upon receiving this data, the low level MAC sub-module 205a determines a data transmission rate for both the user data and the tokens/keys. The MAC sub-module 205a then allocates the security data and user data streams to particular channels or beams for transmission. It is noted that the DPC module in FIG. 2 and in the subsequent Figures does not need to distinguish between data which originated in a data processor and data which originated in a security module. The same DPC processing is applied to both types of information streams and the nature of the DPC processing is completely dependent upon the destination of the data, the pre-coding order, data rates and quality of service (QoS) targets, as determined by a MAC module.

In the block diagram 200, the DPC component 205b of the DPC module 205, utilizes pre-coding coefficients from the smart antenna processor 207, and encodes or watermarks the security data 77a onto the user data streams using a DPC algorithm. These token-embedded data streams are then provided to the smart antenna processor 207 for further processing prior to transmission.

In the smart antenna processor 207, high level security policy data and user channel state and location information are received from the security and data processing modules 203, 201, respectively. Utilizing this information, the smart antenna processor 207 provides beam-steering, pre-equalization, eigen-beam-steering and other smart antenna functions for the transmission of the token embedded user data streams.

Figure 3:
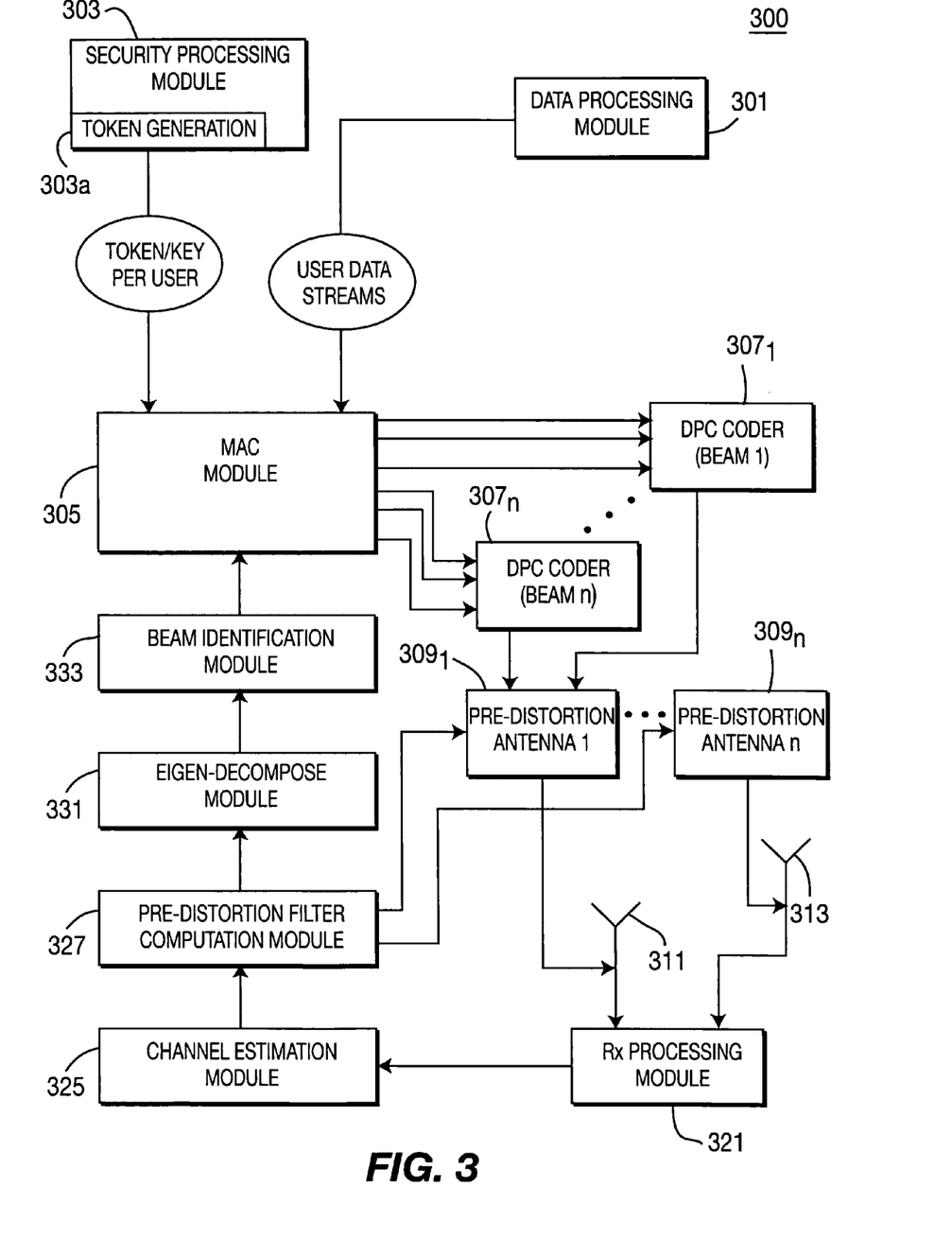
FIG. 3 illustrates a DPC-enabled transceiver which utilizes a plurality of DPC coders to encode data onto beams for transmission.

Referring now to FIG. 3, a DPC-enabled transceiver 300 incorporating the four major components described with reference to FIG. 2 is shown. As configured, the transceiver 300 performs DPC processing on a per-transmission beam basis. In addition to the four major components described above, the present transceiver 300 further comprises a plurality of sub-modules. The data and security processing modules 301, 303 of the present transceiver 300 correspond to similar modules 201, 203 of FIG. 2. Included in the security processing module 303 is a token and key generation sub-module 303a for generating security tokens and keys on a per-user basis.

The MAC module 305 and DPC beam coders $307_1 \ldots 307_n$ of the present transceiver 300 correspond to the MAC module 205 of FIG. 2, but are depicted as separate modules. As previously discussed, these modules may comprise a single component, as depicted in FIG. 2, or multiple components, as in the present transceiver 300. It should be noted that DPC coding functions of the present transceiver 300 are performed by a plurality of DPC coders $307_1 \ldots 307_n$, one per transmission-beam, rather than by a single DPC component.

Also included in the present transceiver 300 are a plurality of pre-distortion antenna modules $309_1 \ldots 309_n$, transmit and receive antennas 311, 313, and a receive processing module 321, collectively considered the smart antenna component of the transceiver 300. The remaining modules, i.e., the channel estimation module 325, the pre-distortion filter computation module 327, the eigen-decompose module 331, and the beam identification module 333 are additional components of the transceiver 300, which may collectively comprise part of the smart antenna component.

User data streams from the data processing module 301 and security tokens and keys from the token generation sub-module 303a are provided to the MAC module 305. The MAC module 305 calculates appropriate data rates and allocates the security and user data to transmission-beams for transmission. These transmission beams are identified and provided to the MAC module 305 by the beam identification module 333. The user and security data, data rates and beam allocation information is then output to the plurality of DPC coders $307_1 \ldots 307_n$ on a per-beam basis. That is, all of the information that will be transmitted on a particular beam is output to a particular DPC coder $307_1 \ldots 307_n$ for encoding. It should be noted that a user's data may be allocated to multiple beams for transmission in order to achieve multiplexing gains. Accordingly, if a user's data is allocated to multiple beams, such data will be DPC processed by a corresponding number DPC coders.

Upon receiving the MAC module 305 output, each DPC coder $307_1 \ldots 307_n$, encodes the provided security data onto user data to form token-embedded data streams which will be transmitted using a previously assigned transmission-beam. As previously described, each DPC coder $307_1 \ldots 307_n$ only processes data for one particular transmission beam. The token-embedded data streams are then output from the DPC coders $307_1 \ldots 307_n$ to the plurality of pre-distortion antenna modules $309_1 \ldots 309_n$ for further processing prior to transmission. Each pre-distortion antenna module $309_1 \ldots 309_n$ receives input from a single DPC coder $307_1 \ldots 307_n$.

Also received in the pre-distortion antenna modules $309_1 \ldots 309_n$ are pre-distortion filter coefficients from the pre-distortion filter computation module 327. The pre-distortion antenna modules $309_1 \ldots 309_n$ apply (or multiply) these filter coefficients to the token-embedded data streams output from the DPC coders $307_1 \ldots 307_n$ to yield scaled versions of such data streams. In particular, these filter coefficients may be utilized as zero-forcing and MMSE linear equalizers across space, time, and frequency domains. Since the filter coefficients are preferably complex values, the scaled output of the pre-distortion antenna modules $309_1 \ldots 309_n$ will likewise preferably be complex values. This scaled or filtered output is then sent from the pre-distortion antenna modules $309_1 \ldots 309_n$ to the transmit antennas 311, 313 for wireless transmission. It should be noted that the pre-distortion filter computation module 327 may also provide ISI information to the pre-distort antenna modules $309_1 \ldots 309_n$, if the antenna modules $309_1 \ldots 309_n$ are so configured to incorporate ISI pre-distortion.

Received in the transmit/receive antennas 311, 313 are pilot signals transmitted from beam-receiving receivers (not shown). These pilot signals are processed by the receiver processing module 321 and input into the channel estimation module 325 where they are utilized for channel estimation.

The channel estimation module 325 outputs channel estimates to the pre-distortion filter computation module 327, where such estimates are utilized to derive filter coefficients. As previously described, these filter coefficients are output to the pre-distortion antenna modules $309_1 \ldots 309_n$, where they are applied separately to each of the token-embedded data streams. The pre-distortion filter computation module 327 also provides its output to the eigen-decompose module 331.

In the eigen-decompose module 331, eigen-decomposition of a MIMO channel is performed according to a $H=USV^H$ decomposition, wherein H is the channel matrix of the MIMO channel, S is a diagonal matrix and U and V are unitary matrices of left and right eigen-vectors (eigenmodes) of the MIMO channel. This decomposition effectively decomposes the "intertwined" MIMO channel as observed by receive antennas 311, 313 into effective non-interfering or orthogonal (or nearly-orthogonal) sub-channels whose channel gains are given by the entries of S. The eigen-vectors provide the coefficients that are applied to the transmit/receive antennas 311, 313 in order to actually "form" orthogonal channels. Once eigen-composition is complete, the eigen-decompose module 331 provides its output to the beam identification module 333.

The beam identification module 333 takes the orthogonal sub-channels that are output from the eigen-decomposition module 331 and combines them into beams onto which user data may be transmitted. Each formed beam may consist of one or several of these sub-channels. In this regard, beam-forming is used to separate between groups of users. For beams that are not fully orthogonal, i.e., nearly-orthogonal beams, any inter-beam interference is ignored. As previously discussed, the MAC module 305 computes the amount of user data that each beam can support and subsequently, allocates data to the beams accordingly. It should be noted that a user's data may be allocated to more than one beam in order to achieve multiplexing gains. Any resulting inter-symbol interference may be resolved by channel pre-distortion, although partial ISI cancellation may be incorporated into the DPC encoders using, for example, Tomlinson-Harashima type pre-coding.

In the present embodiment, the MAC module 305 performs several complex operations including the allocation of users between transmission beams, wherein users whose spatial signatures are highly aligned are allocated to the same beam, while users whose spatial signatures are nearly orthogonal are allocated to appropriate, different beams. Since each user may have multiple eigenmodes, such eigenmodes may be in several different beams. As a result, a given user's data signal may similarly be allocated to different beams. Other complex operations performed by the MAC module 305 include deciding how to form the transmission beams and how the users should be allocated to such beams. For example, the MAC module 305 may decide that a single beam is appropriate, in which case the system transmitter behaves as a DPC-enabled transmitter with no beamforming. Alternatively, the MAC module 305 may determine that the number of required beams should be equal to the number of simultaneously active data streams, in which case no DPC is required and the system is equivalent to a beamforming enabled transmitter with no DPC.

It is anticipated that there will be users whose spatial signatures are not sufficiently aligned with any of the transmission beams to be properly allocated to such beams. In such a scenario, the MAC module 305 develops several alternative beam combinations which are used in a time-shared fashion. Users are then separated according to which beam patterns their spatial signatures are compatible with and transmitted in the appropriate time-slots.

In sum, the MAC 305 module of the present embodiment is preferably configured to: 1) identify all required user signatures; 2) develop appropriate beam patterns and organize such beam patterns into compatible groups; 3) allocate users to appropriate beams; and 4) determine the rate allocated to each user while considering that DPC is used within each beam.

Figure 4:
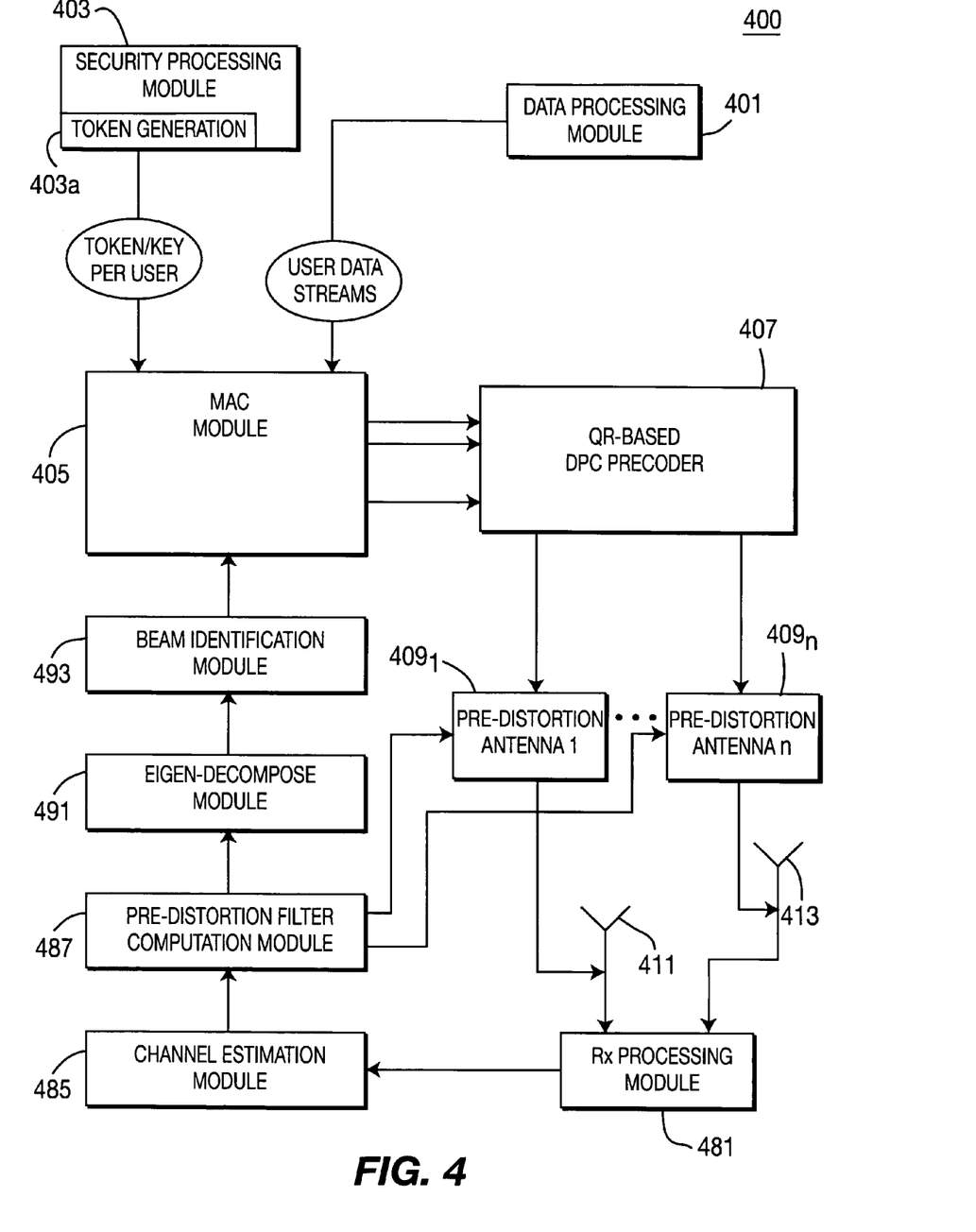
FIG. 4 illustrates a DPC-enabled transceiver which utilizes a single QR-based DPC precoder to encode data onto beams for transmission.

Referring now to FIG. 4, an alternate embodiment of a DPC-enabled transceiver 400 is shown. As configured, the transceiver 400 performs DPC precoder processing collectively on all transmission beams utilizing a single QR-based DPC precoder 407. Included in the present transceiver 400 are data and security processing modules 401, 403. The security processing module 403 includes a token and key generation sub-module 403a for generating security tokens and keys.

Also included in the present transceiver 400 are a plurality of pre-distortion antenna modules $409_1 \ldots 409_n$, transmit and receive antennas 411, 413, and a receiver processing module 481, collectively considered the smart antenna component of the transceiver 400. The remaining modules, i.e., the channel estimation module 485, the pre-distortion filter computation module 487, the eigen-decompose module 491, and the beam identification module 493 are addition components of the transceiver 400, which may collectively comprise part of the antenna component.

User data streams from the data processing module 401 and security tokens and keys from the token generation sub-module 403a are provided to the MAC module 405. The MAC module 405 calculates appropriate data rates and allocates the security and user data to transmission-beams for transmission. These transmission beams are identified and provided to the MAC module 405 by the beam identification module 493. The user and security data, data rates and beam allocation information is then output to the QR-based DPC precoder 407. This output from the MAC module 405 to the QR-based DPC precoder 405 includes a single eigenmode virtual data stream, which provides data for each user. Although data from a particular user may appear in multiple beams, since a single DPC precoder 407 is utilized, the data path is the same.

Unlike the MAC 305 of transceiver 300 previously described, the MAC module 405 of the present embodiment does not need to allocate signal transmissions to different DPC coder modules. Instead, a QR-based approach (utilizing a single QR-based DPC pre-coder 407) is utilized, which is particularly useful for single antenna WTRUs and multi-antenna base stations. This QR-based approach is extended to multi-antenna WTRUs according to the following process. First, each multi-antenna WTRU's channel is decomposed to determine its eigenmodes and the singular values (i.e., channel powers) associated with these eigenmodes. Next, each eigenmode is treated as a channel to a "virtual" single-antenna WTRU. A QR-based decomposition approach is then applied to schedule transmissions to these virtual WTRUs. Each WTRU is "imagined" to be comprised of several virtual WTRUs, each equivalent to a single eigenmode. Accordingly, a controlling MAC controls the decomposition as in the transceiver 300 described with reference to FIG. 3.

It should be noted that, in such a deployment, the number of simultaneous virtual single-antenna WTRUs to which a base station may transmit is limited by the number of transmit antennas at the base station. As a result, the MAC is required to time-share WTRU transmissions according to various parameters. Such parameters include the relative power of the channels (i.e., eigenmodes) to the virtual WTRUs and their cross-interference, which if optimized, maximizes the total data rate delivered in any given time slot. The MAC also applies a set of "fairness criteria" in scheduling transmissions which takes into account factors such as data rate and quality of service (QoS) requirements of the virtual WTRUs, previously used data rates for particular WTRUs, signal-to-noise ratios (SNR) of given eigenmodes, etc.

Upon receiving the MAC module 405 output, the QR-based DPC precoder 407 encodes the provided security data onto the user data to form token-embedded data streams which will be transmitted using a previously assigned transmission-beam. As previously described, the QR-based DPC precoder 407 collectively processes data for all transmission beams. These token-embedded data streams are then output from the DPC precoder 407 to the plurality of pre-distortion antenna modules $409_1 \ldots 409_n$, for further processing prior to transmission.

Also received in the pre-distortion antenna modules $409_1 \ldots 409_n$ are pre-distortion filter coefficients from the pre-distortion filter computation module 487. The pre-distortion filter computation is performed jointly over all the antennas and beams. The pre-distortion antenna modules $409_1 \ldots 409_n$ then multiply these calculated filter coefficients to the token-embedded data streams output from the QR-based DPC precoder 407 to yield scaled versions of such data streams. In particular, these filter coefficients may be utilized as zero-forcing and MMSE linear equalizers across space, time, and frequency domains. The QR decomposition of the channel matrix is utilized for dirty paper coding. Since the filter coefficients are preferably complex values, the scaled output of the pre-distortion antenna modules $409_1 \ldots 409_n$ will likewise be complex values. This scaled or filtered output is then sent from the pre-distortion antenna modules $409_1 \ldots 409_n$ to the transmit antennas 411, 413 for wireless transmission. It should be noted that the pre-distortion filter computation module 487 may also provide ISI information to the pre-distort antenna modules $409_1 \ldots 409_n$, if the antenna modules $409_1 \ldots 409_n$ are so configured to incorporate ISI pre-distortion.

Received in the transmit/receive antennas 411, 413 are pilot signals transmitted from beam-receiving receivers (not shown). These pilot signals are processed by the receive processing module 481 and input into the channel estimation module 425 where they are utilized for channel estimation.

The channel estimation module 485 outputs channel estimates to the pre-distortion filter computation module 487, where such estimates are utilized to derive filter coefficients. As previously described, these filter coefficients are output to the pre-distortion antenna modules 409$_1$ ... 409$_n$, where they are applied separately to each of the token-embedded data streams. The pre-distortion filter computation module 487 also provides its output to the eigen-decompose module 491.

In the eigen-decompose module 491, eigen-decomposition of a MIMO channel is performed according to a $H=USV^H$ decomposition, wherein H is the channel matrix of the MIMO channel, S is a diagonal matrix and U and V are unitary matrices of left and right eigen-vectors (eigenmodes) of the MIMO channel. This decomposition effectively decomposes the "intertwined" MIMO channel as observed by receive antennas 411, 413 into effective non-interfering or orthogonal (or nearly-orthogonal) sub-channels whose channel gains are given by the entries of S. The eigen-vectors provide the coefficients that are applied to the transmit/receive antennas 411, 413 in order to actually "form" these orthogonal channels. Once eigen-composition is complete, the eigen-decompose module 491 provides its output to the beam identification module 493.

The beam identification module 493 takes the orthogonal sub-channels that are output from the eigen-decomposition module 491 and combines them into beams onto which user data may be transmitted. Each formed beam may consist of one or several of these sub-channels. In this regard, beamforming is used to separate between groups of users. For beams that are not fully orthogonal, i.e., nearly-orthogonal beams, any inter-beam interference is ignored. As previously discussed, the MAC module 407 computes the amount of user data that each beam can support and subsequently, allocates data to the beams accordingly.

While the above description was presented in the context of a base station communicating with a plurality of WTRUs, it should be noted that the apparatus and techniques described herein are also generally applicable to single multi-antenna transmitters communicating a plurality of data streams to one or a plurality of receivers, each with one or several receive antennas.

Also, the various DPC beamforming and pre-equalization enabled transceivers described herein support a variety of data services and security/watermarking services. Such transceivers use a MAC which supports viewing WTRUs that appear from a signal propagation point as being comprised of multiple virtual WTRUs, each of which is equivalent to a single eigenmode. In this sense, the MAC operates on the virtual WTRUs. Further, the MAC is enabled to utilize a set of "fairness criteria" in scheduling transmissions to the virtual WTRUs.

The features of the present invention may be incorporated into an IC or be configured in a circuit comprising a multitude of interconnecting components.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. A wireless transmit/receive unit (WTRU) including a transceiver, the transceiver comprising:

a data processing module configured to provide user data streams to a medium access channel (MAC) module and channel state information to a smart antenna processor;

a security processing module configured to generate security data and for providing security policy data;

the medium access control (MAC) module configured to determine data transmission rates for the data streams and security data; and to allocate said data streams and security data to transmission channels for transmission;

a dirty-paper-coding (DPC) module configured to encode the security data onto the user data streams;

the smart antenna processor configured to generate and provide the pre-coding coefficients to the DPC module; and a plurality of antennas configured to transmit the security encoded data streams;

wherein the security processing module further comprises a token generating sub-module configured to generate the security tokens and keys;

wherein the smart antenna module is configured to use the channel state information and the security policy data to provide beam-steering, pre-equalization, and eigen-beam-steering functionality to the transceiver.

2. The WTRU of claim 1, wherein said transceiver is configured to perform a DPC encoding function for each transmission channel, the transceiver further comprising:

a beam identification module configured to combine a plurality of orthogonal sub-channels into a plurality of transmission channels and provide the transmission channels to the MAC module;

a plurality of DPC coders configured to encode security data onto data streams allocated for transmission on a particular transmission channel by the MAC module;

a plurality of pre-distortion antenna modules configured to process encoded data streams received from a particular DPC coder, wherein said processing includes scaling the received data streams using filter coefficients;

the plurality of antennas configured to transmit the scaled and encoded user data streams; and to receive pilot signals; and a receive processing module configured to process received pilot signals;

a channel estimation module configured to determine channel estimates based on the received pilot signals; and a pre-distortion filter computation module configured to calculate filter coefficients based on the determined channel estimates and to provide said filter coefficients to the pre-distortion antenna modules and to an eigen-decompose module, said eigen-decompose module configured to decompose a receiver's reception channel in order to provide orthogonal sub-channels to the beam identification module.

3. The WTRU of claim 2, wherein the plurality of pre-distortion antenna modules perform a pre-distortion function by utilizing the filter coefficients zero-forcing and minimum mean-squared error (MMSE) equalizers across space, time and frequency domains.

4. The WTRU of claim 2, wherein the pre-distortion computation module is configured to provide inter-symbol interference (ISI) information to the pre-distortion antenna modules.

5. The WTRU of claim 1, wherein the MAC module identifies spatial signatures of intended receivers; develops beam patterns and groups said beam patterns into compatible groups; allocates the intended receivers to transmission channels; and determines a data transmission rate for each intended user.

6. The WTRU of claim 1, wherein said DPC module is a QR-based DPC precoder configured to perform a DPC encoding function collectively on a plurality of user data streams, the transceiver further comprising:
   a beam identification module configured to combine a plurality of orthogonal sub-channels into a plurality of transmission channels and provide the transmission channels to the MAC module;
   a plurality of pre-distortion antenna modules configured to process encoded data streams received from the QR-based DPC precoder, wherein said processing includes scaling the received data streams;
   the plurality of antennas configured to transmit the scaled and encoded user data streams; and to receive pilot signals;
   a receive processing module configured to process received pilot signals;
   a channel estimation module for determining channel estimates based on the received pilot signals; and
   a pre-distortion filter computation module configured to calculate filter coefficients based on the determined channel estimates and to provide said filter coefficients to the pre-distortion antenna modules and to an eigen-decompose module, said eigen-decompose module configured to decompose a single-antenna receiver's channel in order to provide orthogonal sub-channels to the beam identification module.

7. The WTRU of claim 6, wherein said transceiver is configured to:
   for a multi-antenna receiver, decompose said receiver's transmission channel to determine said channel's eigenmodes and singular values associated with said eigenmodes; and
   perform QR-based decomposition on each determined eigenmode as if each such eigenmode were a channel to a single-antenna virtual receiver.

8. The WTRU of claim 6, wherein the QR-based DPC precoder utilizes a decomposition of a transmission channel matrix to perform dirty paper coding functions.

9. The WTRU of claim 6, wherein the plurality of pre-distortion antenna modules perform a pre-distortion function by utilizing the filter coefficients zero-forcing and minimum mean-squared error (MMSE) equalizers across space, time and frequency domains.

10. The WTRU of claim 6, wherein the pre-distortion computation module is configured to provide inter-symbol interference (ISI) information to the pre-distortion antenna modules.

11. The WTRU of claim 7, wherein the MAC module is configured to time-share transmissions according to a set of parameters, said parameters including: a relative power of eigenmodes to virtual receivers; and a cross interference between eigenmodes.

12. The WTRU of claim 11, wherein the MAC module is configured to utilize fairness criteria in scheduling the virtual receivers, said fairness criteria including:
   signal-to-noise ratios of the eigenmodes;
   data transmission rate requirements of actual receivers;
   previous data transmission rates to actual receivers; and
   quality of service (QoS) requirements of actual receivers.

13. A method of improving communication over an air interface comprising:
   in a wireless transmit/receive unit having a transceiver:
   providing user data streams to a medium access channel (MAC) module and channel state information to a smart antenna processor;
   generating security data, said security data including security tokens and keys;
   providing security policy data;
   determining data transmission rates for the data streams and security data;
   allocating said data streams and security data to transmission channels for transmission;
   encoding the security data onto the user data streams using a dirty-paper-coding (DPC) technique;
   generating and providing the pre-coding coefficients for use in the DPC technique; and
   transmitting the security encoded data streams utilizing a plurality of antennas;
   utilizing the channel state information and the security policy data to provide beam-steering, pre-egualization, and eigen-beam-steering functionality to the transceiver;
   receiving pilot signals on the plurality of antennas;
   processing the received pilot signals;
   determining channel estimates based on the received pilot signals;
   calculating filter coefficients based on the determined channel estimates;
   providing said filter coefficients to a plurality of pre-distortion antenna modules and to an eigen-decompose module;
   in the eigen-decompose module, decomposing a single-antenna receiver's channel and providing orthogonal sub-channels to a beam identification module;
   in the beam identification module, combining the plurality of orthogonal sub-channels into a plurality of transmission channels;
   providing the transmission channels to the MAC module wherein data transmission rates are determined and wherein data streams and security data are allocated to transmission channels for transmission;
   encoding security data onto data streams allocated for transmission utilizing a plurality of DPC coders, wherein one DPC coder encodes data for transmission on a particular transmission channel;
   processing encoded data streams received from a particular DPC coder with a particular one of the plurality of pre-distortion antenna modules, wherein said processing includes scaling the received data streams using the filter coefficients; and
   transmitting the scaled and encoded user data streams utilizing the plurality of antennas;
   performing a pre-distortion function in the plurality of pre-distortion antenna modules by utilizing the filter coefficients zero-forcing and minimum mean-squared error (MMSE) equalizers across space, time and frequency domains;
   providing ISI information to the pre-distortion antenna modules.

14. The method of claim 13, wherein the encoding security data onto data streams is performed by a single, QR-based DPC precoder; and wherein the plurality of pre-distortion antenna modules process encoded data streams received from said single, QR-based DPC precoder.

15. The method of claim 14, wherein the eigen-decomposing is performed for a multi-antenna receiver, the method further comprising:

decomposing the multi-antenna receiver's transmission channels to determine said channels' eigenmodes and singular values associated with said eigenmodes; and performing QR-based decomposition on each determined eigenmode as if each such eigenmode were a channel to a single-antenna virtual receiver.

16. The method of claim 14, wherein the QR-based DPC precoder utilizes a decomposition of a transmission channel matrix to perform DPC functions.

17. The method of claim 14, further comprising performing a pre-distortion function in the plurality of pre-distortion antenna modules by utilizing the filter coefficients zero-forcing and minimum mean-squared error (MMSE) equalizers across space, time and frequency domains.

18. The method of claim 14, further comprising providing ISI information to the pre-distortion antenna modules.

19. The method of claim 14, wherein the MAC module time-shares transmissions according to a set of parameters, said parameters including: a relative power of eigenmodes to virtual receivers; and cross interference between eigenmodes.

20. The method of claim 14, wherein the MAC module is configured to utilize a fairness criterion in scheduling the virtual receivers, said fairness criteria including:

signal-to-noise ratios of the eigenmodes;

data transmission rate requirements of actual receivers;

previous data transmission rates to actual receivers; and quality of service (QoS) requirements of actual receivers.

* * * * *